3,098,082
PROCESS OF EXTRACTING 3-AMINO COMPOUNDS FROM THE GENUS FUNTUMIA

Jean Louis Paul Mainil, Watermael-Boitsfort, Belgium, and Qui Khuong Huu, Paris, France, assignors to Societe Anonyme Oletta, Luxembourg, Luxembourg
No Drawing. Filed Feb. 15, 1960, Ser. No. 8,485
Claims priority, application Luxembourg Feb. 13, 1959
7 Claims. (Cl. 260—397.3)

This invention relates to alkaloids and associated compounds.

Copending application Ser. No. 763,431, filed Sept. 26, 1958, and assigned to the same assignee, relates to the obtaining of alkaloids and other new compounds isolated from plants of the genus Funtumia (Apocynaceae) which are of interest because they can serve as starting materials or intemediaries for the manufacture of other steroid molecules.

Among these alkaloids extracted from the species *latifolia*, two have a particular interest. These two conform respectively to the molecular formulae $C_{21}H_{37}ON$ (funtumidine) and $C_{21}H_{35}ON$ (funtumine).

The present invention is concerned with:

(A) Improvements introduced generally into the technique of extracting these compounds isolated from plants of the genus Funtumia.

(B) Synthesis and transformation reactions with the aid of funtumine, funtumidine and isofuntumidine (epimere of funtumidine).

(C) New aminated products containing sterolic nucleus, extracted from the species *africana* and the obtaining thereof.

(D) Synthesis and transformation reactions with the aid of the compounds mentioned under C.

(A)

The new substances described in the aforesaid copending application as well as those which are described hereinafter are contained in the leaves of Funtumia in combination with latex, chlorophyll and other triterpenic compounds.

To extract the new products the complex combination of triterpenes, alkaloids, tannoids, rubber and chlorophyll has to be treated with a strong base, such as for example slaked lime, in order to dissociate the complex and so to obtain a product which can be extracted.

According to the invention, a quantity of the aforesaid combination, to which an organic salt forming acid is added (citric, tartaric, oxalic or other acid), is treated with a 25% caustic soda solution or with another strong alkali (slaked lime) at a temperature in the region of 40° C. for two hours, this treatment avoiding that a large quantity of alkaloids remains combined with triterpenes and is thus impossible to recover in free form. There then follows an extraction treatment with a solvent and the resulting substance is evaporated and treated as described in the aforesaid application.

EXAMPLE 1

The leaves are finely crushed and made alkaline by mixing them with a solution having the same weight as the leaves and containing 10% anhydrous sodium carbonate.

The plants, so made alkaline, are kept in air for at least 6 hours before extraction, in order to permit the bases to be displaced.

The leaves made alkaline are then placed in a vertical, horizontal or rotary extractor. They are extracted with chloroform until they contain no further principles to be extracted. The chloroform is then evaporated to dryness in vacuo. An aqueous methanol acetic acid solution containing 40–60% of methanol is added to the resinous mass at a temperature of 70° C. in order to obtain a 25% titre of acetic acid.

Operation in this strong acidified and selective medium enables separating, in a large proportion, the active principles, which then pass in solution from the other substances of the combination. The residues, which represent about 80% of the combined mass extracted, are separated by filtration.

The separated principles in methanol acetic solution are made alkaline with a milk of lime with a concentration of at least 25% and are extracted with chloroform. This chloroform is then dried on anhydrous calcium chloride and evaporated to dryness.

The residue is then treated with filtrated anhydrous benzene. The latter is introduced into a column of neutral alumina representing 40 times the weight of the principle to be treated.

The alkaloids which are having been obtained are purified by successive recrystallizations in ethyl acetate.

EXAMPLE 2

1,000 gr. of crushed leaves of *Funtumia africana* are made alkaline with 1,000 cc. of water containing 2% of gaseous ammonia and are left standing for 12 hours. Extraction is carried out in an apparatus of the Soxhlet type with 5,000 cc. ethyl acetate for 8 hours.

The resulting solution is evaporated until its volume is reduced to 750 cc. 100 cc. of acetic acid at 80% are added. The rest of the ethyl acetate is expelled and methanol-water 60° is added. Then the solution is made alkaline with ammonia and extraction is carried out with 750 cc. of methylene chloride which is evaporated. In this manner the same bases which can be separated by ion-exchange chromatography are obtained.

EXAMPLE 3

1,000 gr. of crushed leaves of *Funtumia africana* are percolated with 7,000 cc. of methanol containing 2% of acetic acid.

The solution is evaporated in vacuo until its volume is reduced to 1,000 cc.

Water is then added to obtain a methanol containing acetic acid which has an alcohol content of 60°. This is left standing for 12 hours.

Filtration is then carried out, during which the coagulate comprising the chlorophyll, the rubbers and the triterpenic acids, namely the ursolic acid, is separated. The insoluble material is constituted of a substance which does not react with mercuric iodide but does react in the Liebermann reaction. After purification, its melting point is 245° C. It is hereinafter called principle A.

The filtrate is then made alkaline with ammonia and extracted with a solvent, for example, methylene chloride. In the case of Example 1, the quantity of methylene chloride can be about 750 cc. The solution comprising the solvent and the alkaloid bases is evaporated.

The bases freed from solvent, in this case methylene chloride, are agitated with a solvent such as, for example, petroleum ether. They thus pass from the oil state into the pulverulent state, constituting residues and the solvent (petroleum ether) is loaded with impurities.

The residues, after being taken up in benzene or another suitable solvent, are fixed on a chromatographic column employing alumina, silica, ion-exchangers. The eluants separate the absorbed principles successively.

EXAMPLE 4

*(By a Solvent Which is Neither Polar nor Chloric)*

The chloroform mentioned in Example 1 as the extraction liquid is replaced by benzene on plants made alkaline.

(B)

It is possible to transform funtumidine into funtumine and the latter into funtumidine by a oxidation reaction in one case and a reduction reaction in the other.

Starting from funtumine it is possible to obtain by reduction: 3α-amino-20β-hydroxy (5α) pregnane (isofuntumidine).

Starting from funtumine it is possible, as explained in said copending application, to obtain: 3,20-dioxo-(5α) pregnane It can be shown that, starting from funtumidine and isofuntumidine, it is possible to obtain 20α (or β) hydroxy-3-oxo-(5α) pregnane also by deamination.

To carry out this deamination, the following procedures are possible:

Isofuntumidine can be obtained by reduction with potassium borohydride as follows:

4 gr. of the alkaloid C (funtumine) are dissolved in 200 cc. of methanol and stirred in the presence of 4 g. of potassium borohydride, added in small portions. Stirring is continued for 4 hours. The reaction medium is then diluted with 1 litre of water and extracted three times with methylene chloride. The organic phase is washed twice with water, dried over anhydrous sodium sulphate, filtered and distilled to dryness. There are thus obtained 3.95 g. of white solid product. By sublimation under vacuum (0.01 mm. Hg) at 150°, there are obtained 3.78 g. of isofuntumidine or 3α-amino-20β-hydroxy-(5α)-pregnane after purification, the melting point is stabilized at =170° C. $(\alpha)_D = -6.2(CHCl_3)$ c.=2.7.

It is also possible to obtain isofuntumidine by catalytic reduction from the alkaloid C (funtumine) as follows:

50 mg. of platinum oxide are reduced by stirring in 3 cc. of glacial acetic acid in a hydrogen atmosphere. 40 mg. of the alkaloid C, previously dissolved in 50 cc. of acetic acid, are added to the reduced platinum suspension and then stirred in a hydrogen atmosphere for 12 hours. The acetic solution is filtered, then made alkaline with ammonia in the presence of a small quantity of ice and extracted with ether. The ethereal phase is washed in water and distilled to dryness; 35 mg. are obtained. Crystallization in ethyl acetate yields a product which can be identified as 3α-amino-20 β-hydroxy-3-oxo-(5α)-pregnane. Melting point: 167° C. Stabilized by recrystallization at 170°. $(\alpha)_D = -6.2(CHCl_3)$ c.=2.7.

Deamination of Isofuntumidine

*3α Amino Leading to 20β Hydroxy-3-Oxo-5α-Pregnane*

1. g. of 3α-amino-20β-hydroxy-3-oxo-(5α)-pregnane (isofuntumidine) is dissolved in a mixture of ether and chloroform (2:1).

200 mg. of hydrochlorous acid in anhydrous ethereal solution are introduced in 2 lots, while continuously stirring, at a temperature of 10° and during 1 hour. On starting the operation, it is necessary to add 5 g. of dry sodium sulphate to eliminate the possible traces of water originating from the refrigeration. Filtration is effected for separating the sodium sulphate. The filtrate, distilled to dryness in vacuo, yields 1.15 g. of N-chloramine, which are then treated by boiling under reflux with a solution of sodium ethanolate (800 mg. of sodium; 600 cc. of absolute ethanol) for 40 minutes. This mixture is then poured into 1 litre of sulphuric acid diluted to 1% and then left standing for 24 hours. The precipitate is centrifuged off and it is redissolved in 200 cc. of methylene chloride. The methylene chloride is washed with water, and dried over anhydrous sodium sulphate. After evaporation in vacuo, 710 mg. of crude product are obtained.

By sublimation and recrystallization from heptane or dilute alcohol, a pure product is obtained which melts at M.P. 185° C.

Deamination of Isofuntumidine by the Ruschig Method 2.47 g. of 3α-amino-20β-hydroxy-3-oxo-(5α)-pregnane are dissolved in 100 cc. of methylene chloride. Stirring is continued for 1 hour and 1.2 g. of N-chlorosuccinimide are added. After 30 minutes, the methylene chloride is washed three times with water (50 cc. each time). It is dried over sodium sulphate and evaporated to dryness in vacuo. There are obtained 2.8 g. of N-chloroamine, which is then treated with a solution of sodium ethanolate solution (2 g. of sodium; 120 cc. of absolute ethanol) while boiling under reflux for 40 minutes. All the substance are poured into 2 litres of 1% sulphuric acid. This precipitate is extracted with methylene chloride (3 times 100 cc.). It is washed in bicarburetted water and then with water. It is dried over sodium sulphate and evaporated to dryness in vacuo, this yielding 2.17 g. of crude product. By successive recrystallization stages in heptane pure 20β-hydroxy-3-oxo-(5α)-pregnane is obtained.

By the same methods it is possible to carry out the:

Deamination of the Alkaloid A (Funtumidine)

Starting from 1 g. of alkaloid A, 0.7 g. of 20α-hydroxy-3-oxo-(5α)-pregnane in crude form is obtained by following exactly the same methods as for 3α-amino-20β-hydroxy-3-(5α)-pregnane. In this case, ethanol is used as the crystallization solvent.

The methods are also suitable to deaminate the alkaloid C and to obtain the allopregnane-dione.

Acetylation of 20β-Hydroxy-3-Oxo-(5α)-Pregnane 200 mg. of 20β-hydroxy-3-oxo-(5α)-pregnane are dissolved in 5 cc. of acetic anhydride and 1 cc. of pyridine. The mixture is boiled on a water bath for 1 hour, then diluted with water and extracted with ether. The ethereal extract is washed with water, then dried over sodium sulphate and evaporated to dryness. 210 mg. of crude product are obtained, which are subjected to chromatography on 6 g. of alumina. Extraction with benzene yields 156 mg., which are crystallized from ethanol.

Acetylation can also be carried out in the cold by operating in the cold in ether in the presence of acetic anhydride.

The acetylated derivative obtained has a melting point of 148° C. $\alpha_D = +57$.

Acetylation of 20α-Hydroxy-3-Oxo-(5α)-Pregnane

The procedure adopted is the same as in the preceding case. Starting from 146 mg. of 20α-hydroxy-3-oxo-(5α)-pregnane, 110 mg. of acetylated derivative are obtained after chromatography.

Obtaining the Ketoxime of 20β-Hydroxy-3-Oxo-(5α)Pregnane 1 g. of 20β-hydroxy-3-oxo-(5α)-pregnane is treated while boiling under reflux for 2 hours with the previously filtered solution containing 1 g. of hydroxylamine hydrochloride, 3 g. of dry sodium acetate and 100 cc. of methanol. The methanolic solution is concentrated, diluted in water and extracted with methylene chloride. After washing with water and drying over sodium sulphate, it is distilled to dryness and there are obtained 1.05 g. of crude ketoxime. Purification is effected by recrystallization from ethanol.

The ketoxime of 20α-hydroxy-3-oxo-(5α) pregnane is also obtained by the same process.

These isomers in position 20 ketoximes are very interesting intermediaries for the obtention of Funtumidine or isofuntumidine starting from 5α-pregnane derivatives with a ketonic group in position 3.

The Method is Catalytic Reduction of Ketoxime 100 g. of platinum oxide are reduced by stirring in 15 cc. of acetic acid in anhydrogen atmosphere and the suspension of reduced platinum has added thereto 200 mg. of ketoxime of 20(α or β)hydroxy-3-oxo(5α)-pregnane dissolved in 15 cc. of acetic acid. After stirring for 3 hours in a hydrogen atmosphere, the theoretical quantity of hydrogen (27 cc.) is consumed. The substance is filtered, water is added, made alkaline with ammonia in the presence of ice and extracted with ether. The ethereal phase is washed with water, dried over sodium sulphate and evaporated to dryness in vacuo. 178 mg. of white solid product are obtained which are saponified in alkaline medium. By sublimation and crystallisation in ethyl acetate, 3α-amino-20(β or α)-hydroxy-(5α)-pregnane is obtained.

*Conversion of Funtumine in Androstane-Ol-One*

It is possible by this transformation to prepare funtumine by chromic oxydation of funtumidine or isofuntumidine as follows:

37 mg. of $CrO_3$, dissolved in a minimum of water, are added to 100 mg. of isofuntumidine or funtumidine dissolved in acetic acid. The mixture is left standing for 24 hours at the temperature of the laboratory, and is poured onto ice, made alkaline with ammonia and extracted with ether.

The ethereal phase washed with water, dried over sodium sulphate, distilled to dryness in vacuo, leaves a product which crystallizes in ethyl acetate. After being recrystallized 3 times from ethyl acetate, the following data are obtained: M.P. 126° C. $\alpha_D = +100°$ (CHCl$_3$, c.=1).

Analysis for $C_{21}H_{35}ON$ calculated, percent: C: 79.44; H: 11.11; N: 4.41. Found: C: 79.49; H: 11.20; N: 4.32.

*Acetylation of Funtumine*

5 g. of funtumine obtained as described hereinabove are boiled under reflux on a silicone bath at 170° C. in the presence of 50 ml. of acetic anhydrid for 1 hour. It is concentrated in vacuo on a boiling water bath and allowed to cool. The acetylated derivative crystallizes. This is dried and 4.205 g. are obtained. By recrystallization from ethanol a first discharge of 3.440 g. is obtained. The combined mother liquors are sublimed at 160° C./0.01 mm. Hg and give 1.85 g. of acetyl funtumine.

*Oxydation With Perbenzoic Acid of Acetyl Funtumine-3α-Acetamido-17β-Acetoxy-(5α)-Androstane*

*Perbenzoic oxydation.*—750 mg. of perbenzoic acid obtained as stated in "Organic synthesis," page 431, in chloroformic solution are added to 2 g. of acetyl funtumine and left in contact for 8 days at the temperature of the laboratory. The mixture is made alkaline with an aqueous solution of disodium carbonate and extracted with chloroform. The chloroformic extract is washed with water, dried over sodium sulphate and evaporated to dryness in vacuo. A solid residue comprising 2.165 g. is left.

*Girardization*

The crude product previously obtained is boiled under reflux for 3 hours in the presence of 40 ml. of ethanol, 2 ml. of acetic acid and 2 g. or reagent T of Girard and Sandulesco. The product is concentrated in vacuo to 10 ml. and extracted with ether after adding 60 ml. of water. The ethereal phase, washed in water, dried over sodium sulphate and evaporated to dryness in vacuo leaves 1.71 g. of non ketonic derivative. A first crystallization of the acetone leads to 875 mg. of white crystals (M.P. 180° C.). After being recrystallized twice from acetone the following data are obtained: M.P. 185° C; $(\alpha)_D +32°$ (CHCl$_3$, c.=1.2).

Analysis for $C_{23}H_{37}O_3N$ (product sublimed at 160° C.).

The aqueous phase resulting from the girardization (after ethereal extraction) is hydrolized by adding 10 ml. of hydrochloric acid and boiling for 1 hour. It is again made alkaline with ammonia, extracted with ether in the usual manner and 293 mg. of the initial acetyl funtumine are obtained.

*Saponification in the Autoclave of 3α-Acetamido-17β-Acetoxy - (5α) - Androstane - 3α-Amino-17β-Hydroxy (5α)-Androstane*

11 g. of the obtained product are introduced into an autoclave in the presence of 40 g. of soda in the form of pellets, 100 ml. of water, 200 ml. of ethanol and are heated to 180° C. for 4 hours. After cooling the substance is concentrated to drive off the alcohol and extracted with ether after adding 500 ml. of water. The ethereal extract, washed with water, dried over sodium sulphate and evaporated to dryness in vacuo, leaves 8.06 g. of crystallized crude product. By being recrystallized from ethyl acetate or ether, the following data are obtained:

M.P.=171° C.; $\alpha_D = +28°$ (CHCl$_3$, c.=0.65).

Analysis for $C_{19}H_{33}ON$ (291.46): product sublimed at 150° C.

It is possible to deaminate the 3α-amino-17β-hydroxy-5α-androstane by action of ClOH, $SO_4H_2$, or sodium ethanolate, or by the N-chlorosuccinimide method, as described hereinabove.

The substance which is obtained is: 17β-ol-3-one-androstane.

It is also possible to dissociate certain new aminated sterolic compounds from their organic combinations with the triterpenes, tannoids, rubbers and compounds with chlorophyll.

These alkaloids isolated from the *africana* species are different from those isolated from the *latifolia* species.

These alkaloids are extracted by the methods already described in the aforesaid application.

By way of example:

1000 g. of crushed *Funtumia africana* leaves are percolated with 7000 cc. of methanol containing 2% acetic acid.

The solution is evaporated in vacuo until 1000 cc. are obtained.

Water is then added to obtain an acetic methanol with an alcoholic content of 60°. It is left standing for 12 hours.

Filtration is then carried out, during which the coagulate comprising the chlorophyll, the rubbers and the triterpenes, particularly ursolic acid and tannoids, is separated. This insoluble substance is formed by a substance which does not react to the iodomercuric reagent, but reacts well to the Liebermann reaction. After purification, its melting point is 245° C. It is principle A.

The filtrate is then made alkaline with ammonia and treated with a solvent, for example methylene chloride. In the case of the previous Example 1, the quantity of methylene chloride can be 750 cc. The solution containing the solvent and the sterolic compounds is evaporated.

These bases freed from solvent, namely, methylene chloride in the case in question, are stirred with a solvent, such as for example petroleum ether. They thus pass into the solvent, which leaves a mass of residues, this then being purified in the form of oxalate.

The petroleum ether is evaporated and the bases are redissolved in benzene or another appropriate solvent. The latter is conveyed to a chromatography column employing alumina, silica, ion exchangers.

The eluants successively remove:

(I) Dimethyl funtumafrine—
By elution with benzene

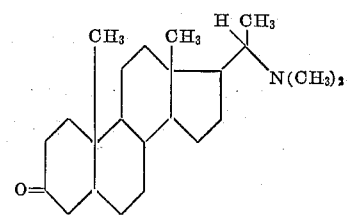

Empirical formula=$C_{22}H_{37}ON$. Infra-red spectrum carbonyl C=O at 1706 cm.$^{-1}$. Melting point=176° C. $(\alpha)_D=+45°$ (CHCl$_3$, c.=1,8). (Principle F.)

(II) Methylfuntumafrine—
By elution with benzene + 1% ether

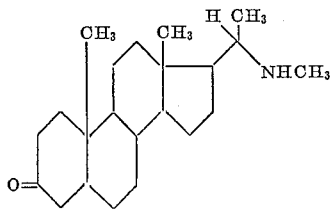

Infra-red spectrum: carbonyl C=O at 1706 cm.$^{-1}$. Formula $C_{22}H_{39}ON$. M.P. 160°. $(\alpha)_D+43°$ (CHCl$_3$, c.=1,3). Principle I.)

(III) Dimelthylfuntuphyllamine—
By elution with ether + 2% ethanol.

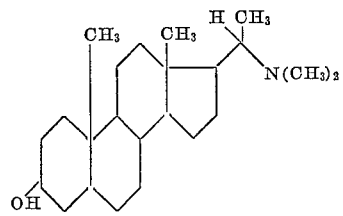

Formula $C_{23}H_{41}ON$. Infra-red spectrum: OH band at 3330 cm.$^{-1}$. M.P. 172° $(\alpha)_D=+24°$ (CHCl$_3$, c.=1). (Principle J.)

(IV) Methylfuntuphyllamine—
Completing of the elution with ether + 2% ethanol

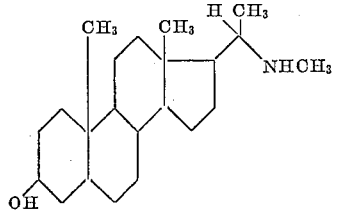

Formula: $C_{22}H_{39}ON$. M.P. 214°. $(\alpha)_D=+24°$ (CHCl$_3$, c.=0.6). Infra-red spectrum: NH, OH bands in the regions of 3367 cm.$^{-1}$ and 3185 cm.$^{-1}$. (Principle G.)

(V) Funtuphyllamine—
Eluted with ether + 10% ethanol

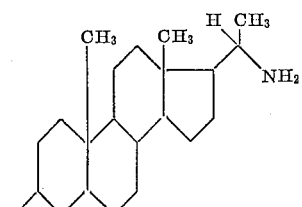

Formula $C_{21}H_{37}ON$. $(\alpha)_D=+13°$ (CHCl$_3$, c.=1.3). M.P.: 173°. Infra-red spectrum: OH and NH$_2$ bands in the regions of 3226 cm.$^{-1}$ and 3378 cm.$^{-1}$. (Principle H.)

In the case of separation on a neutral column with 50 times the weight of treated alumina, the alkaloids F, G, H, I, J are eluted as described above.

They could be separated on a silica column or by ion exchangers etc.

The extraction techniques make it possible to dissociate the compounds of rubber, chlorophyll, resins, tannoids, triterpenic substances and the alkaloids forming the total alkaloid in the plant.

These bases are of therapeutic interest as hypotensors and anti-inflammatory agents. They also have industrial interest as a starting material for the synthesis of steroids.

The bases G and H can be deaminated by the processes described above in respect of isofuntumidine, i.e.:
(1) By the method of hypochlorous acid
(2) By N-chlorosuccinimide, 3β-hydroxy-20-oxo-(5α)-pregnane is obtained with a M.P. at 194° C. and $\alpha_{(D)}=+91°$ in ethanol.

The base I can be deaminated by these same methods so as to obtain:
Allopregnane-dione with a M.P. of 200°ϵ and $(\alpha)_D=+122°$ in ethanol.

What we claim is:
1. A process for obtaining predetermined compounds from plants of the genus Funtumia (Apocynaceae), species africana, said process comprising treating the finely crushed leaves of said plants with an alkaline solution to dissociate said compounds from the complex combination of triterpenes, alkaloids, tannoids, rubber and chlorophyll in the leaves and to obtain a product which is then submitted to extraction by treating with a strong alkali at a temperature of about 40° C. for substantially two hours the bulk of the combination to which has been added an organic salt forming acid, the bulk being extracted by a solvent, evaporated to dryness, the residue redissolved in benzene being conveyed to a chromatography alumina column, the eluants successively removing
a principle having a melting point of 176° C.,
a principle having a melting point of 160° C.,
a principle having a melting point of 172° C.,
a principle having a melting point of 214° C.,
a principle having a melting point of 173° C.

2. A process for obtaining predetermined compounds from plants of the genus Funtumia (Apocynaceae), species africana, said method comprising placing crushed leaves of the plants, which leaves have been made alkaline in an extractor, submitting the said leaves to an extraction operation with chloroform, evaporating the chloroform to dryness, adding an aqueous methanol acetic acid solution containing 40–60% of methanol to the resinous mass to separate a large proportion of the active principles which then pass in solution, the latter being made alkaline and being extracted by chloroform whilst the residue being treated with benzene and the latter being introduced into an alumina column in a ratio of about 40 times the weight of the principle to be treated.

3. A process according to claim 1 wherein the crushed leaves are made alkaline, are submitted to an extraction operation by the use of ethyl acetate, and wherein after evaporation acetic and methanol-water 60% is added and extraction is carried out after alkalinization by methylene chloride and the latter is evaporated to give the principles which are separated by chromatography.

4. A process for obtaining predetermined compounds from plants of the genus Funtumia (Apocynaceae), species africana, said process comprising submitted crushed leaves of said plants to the action of an alcoholacid of the methanol acetic acid type, evaporating the resulting solution and adding water thereto, permitting the solution to stand and separating therefrom a coagulate comprising chlorophyll, resins and rubber constituting the insoluble is separated, after which the extract is made alkaline extraction being effected by a solvent of the methylene chloride type, the solution containing alkaloid principles being evaporated and the principles freed from the solvent being treated with a solvent of the petroleum ether type and passed to the pulverulent state and constituting a residue which after dissolution in a solvent is submitted to chromatography.

5. A process according to claim 2 wherein benzene is used as the extracting liquid.

6. A process for the preparation of alkaloidal and chemical compound principles from finely ground parts of plants of the genus Funtumia (Apocynaceae), species *F. africana*, said process comprising subjecting said parts to the action of an extraction solvent, agitating the solvent with an acid solution after complete extraction to separate the solvent from the acid solution which contains said principles, rendering said principles in acid solution alkaline to dissociate the alkaloidal principles from the other principles, separating the alkaloidal principles from the extract by a solvent selected from the group consisting of ether, chloroform, ethyl and methyl solution and then separating the alkaloidal principles to obtain successively a principle having a melting point of 176° C., a principle having a melting point of 160° C., a principle having a melting point of 172° C., a principle having a melting point of 214° C., and a principle having a melting point of 173° C.

7. A process according to claim 1 in which the combination of triterpens, alkaloids, tannoids, rubber and chlorophyll to which an organic salt forming acid is added is treated with a strong alkali.

References Cited in the file of this patent
UNITED STATES PATENTS
2,108,646   Bockmuhl et al. _____ Feb. 15, 1938

OTHER REFERENCES
Journal Amer. Chem. Soc., p. 2905 (1958), article by Jeger et al.